United States Patent [19]

Miyamoto et al.

[11] Patent Number: 4,965,044
[45] Date of Patent: Oct. 23, 1990

[54] METHOD OF SINTERING CERAMICS AND METAL DISPERSED REINFORCED CERAMICS OBTAINED THEREBY

[75] Inventors: Yoshinari Miyamoto, Kamo 3-3-32, Kawanishi-shi, Hyogo; Osamu Yamada, Kurotani 513, Yao-shi, Osaka; Mitsue Koizumi, Tamaicho 3-6-22, Toyonaka-shi, Osaka; Osamu Komura, Hyogo; Eiji Kamijo, Hyogo; Masaaki Honda, Hyogo; Akira Yamakawa, Hyogo, all of Japan

[73] Assignees: I. Sumitomo Electric Industries, Ltd., Osaka; Yoshinari Miyamoto, Hyogo; Osamu Yamada; Mitsue Koizumi, both of Osaka, all of Japan

[21] Appl. No.: 392,287

[22] Filed: Aug. 11, 1989

Related U.S. Application Data

[60] Division of Ser. No. 158,115, Feb. 16, 1988, Pat. No. 4,906,295, which is a continuation of Ser. No. 735,206, May 17, 1985, abandoned.

[30] Foreign Application Priority Data

| May 18, 1984 [JP] | Japan | 59-100893 |
| May 18, 1984 [JP] | Japan | 59-100894 |
| May 18, 1984 [JP] | Japan | 59-100895 |
| May 18, 1984 [JP] | Japan | 59-100896 |

[51] Int. Cl.$^5$ .............................................. B22F 3/00
[52] U.S. Cl. ........................................ 419/12; 419/10; 419/11; 419/13; 419/14; 419/17; 419/18; 419/45; 75/230; 75/236; 75/239; 75/240; 75/244; 75/245; 75/248
[58] Field of Search ................. 75/230, 244, 236, 239, 75/240, 245, 248; 419/45, 10, 11, 12, 13, 14, 17, 18; 423/53, 62, 69, 81, 111

[56] References Cited

U.S. PATENT DOCUMENTS

| 3,353,954 | 11/1967 | Williams | 75/201 |
| 4,610,726 | 9/1986 | King | 75/233 |
| 4,689,077 | 8/1987 | Chevigne et al. | 75/233 |
| 4,746,363 | 5/1988 | DeAngelis | 75/244 |

OTHER PUBLICATIONS

Crider, Joey F., "Self—Propagating High Temperature Synthesis–A Soviet Method for Producing Ceramic Materials", Ceramic Eng. & Science Proceedings, Sep.-Oct. 1982, pp. 519–528.

*Primary Examiner*—Stephen J. Lechert, Jr.
*Assistant Examiner*—Leon Nigohosian, Jr.
*Attorney, Agent, or Firm*—Wenderoth, Lind & Ponack

[57] ABSTRACT

The present invention relates to a method of sintering ceramics and ceramics obtained by said method. According to the present invention, the synthesis and sintering of ceramics can be simultaneously carried out by utilizing the reaction heat generated when at least one metallic element selected from metallic elements of IIb, IVb, Vb and VIb groups of the Periodic Table is combined with at least one nonmetallic element such as B, C N and Si without heat or by preliminarily heating the ceramics at temperatures remarkably lower than the usual sintering temperature ceramics thus-produced are superior in abrasion resistance and corrosion resistance. Furthermore, according to the present invention, particles of the same kind of metal as that used in constructing the ceramics comprising the above described metallic elements and nonmetallic elements are dispersed in a matric comprising said ceramics to obtain metal dispersed reinforced ceramics in which both the matrix and the metallic particles are strongly and chemically bonded to each other. According to the latter procedure, ceramic materials having high temperature characteristics, high corrosion resistance and high abrasion resistance, as well as high toughness and high impact resistance can be obtained.

6 Claims, 2 Drawing Sheets

METHOD OF SINTERING CERAMICS AND METAL DISPERSED REINFORCED CERAMICS OBTAINED THEREBY

This is a Divisional Application of Ser. No. 07/158,115, filed Feb. 16, 1988, U.S. Pat. No. 9,906,295 which in turn is a Continuation Application of Ser. No. 735,206, filed May 17, 1985. now abondoned.

The present invention relates to the art of sintering ceramics without adding heat or at temperatures remarkably lower than the usual sintering temperature of ceramics powders. At this juncture, the energy required for sintering the ceramics is the reaction heat generated when metallic elements are reacted with nonmetallic elements in the ceramic mixture to synthesize the ceramics. That is to say, the present invention is characterized by simultaneously synthesizing and sintering the ceramics in one process. The sintered body can be densified by pressing it during the synthesis thereof or after the sythesis thereof.

In addition, the present invention relates to ceramics, which are improved in thoughness and strength by dispersing spherical metallic particles strongly bonded chemically to the ceramics in the matrix of ceramics, and a method of producing the same. The energy required for sintering these metal-dispersed reinforced ceramics is the reaction heat generated when the metallic elements are combined with the nonmetallic elements to synthesize the ceramics. That is to say, the present invention is characterized in that the synthesis and sintering of the ceramics and the dispersion of the metallic particles can be simultaneously completed in one process.

Furthermore, the present invention relates to a method of producing particularly large-sized and uniform sintered bodies in which a pressed body of ceramics is continously sintered from within.

Still further, the present invention relates to a method of producing a composite, in which a layer of ceramics of high quality is adhered to the surface of a metallic body, at a lower energy consumption.

Generally speaking, ceramics have been widely used in structural materials and functional materials, that is to say, working tools and sliding parts, which would be remarkably worn if they were made of metals, and such wide use is due to the superior physical and chemical characteristics such as higher hardness and abrasion resistance of the ceramics in comparison with metals.

In almost all cases, ceramics have been produced by pressing powders and then sintering the pressed body. Up to the present time there has been used a method utilized the surface energy of powders heated by external heat in an atmosphere such as air, a gas and a vacuum, and a method in which the substances forming a liquid phase at lower temperatures are added and the sintering is errected by utilizing the surface tension of the liquid phase.

These methods have had the common problem in that since the heat is added to the pressed body from the outside, there is the possibility that the pressed body may be broken due to the generation of thermal gradients, the gas being trapped within the sintered body, the grains being grown on the surface of the sintered body and the like.

In order to obtain compact ceramic articles, a process for synthesizing the ceramic powders and a process for sintering the ceramic powders have been required. Accordingly, the prior art processes have been very complicated and has the time of production long. Also, there has been large energy loses associated with the prior art processes. For example, where a compact SiC article is obtained by the conventional method, at first in the Atison's method of synthesizing powders, $SiO_2$ powders are mixed with C powders, the resulting mixture is pressed in the form of stick, then the stick-like block is electrified to heat and thereby sythesize SiC, and the block being smashed to pieces to obtain SiC powders. Further, an assistant combustion agent must be added to the SiC powders obtained in the above described manner, the resulting mixture must be pressed into the desired form, and then the pressed body must be sintered at higher temperatures to obtain a compact SiC Article. As described above, since a process for synthesizing ceramic powders and a process for sintering the powders have been used separately in the conventional method, the process has been very complicated and high temperatures of about 2,000° C. must be separately obtained in the synthesis of powders and the sintering of powders, so that much energy is required.

In addition, in general, an assistant sintering agent must be added to the material ceramics in order to promote the densification of ceramics in the sintering of ceramics. The quantity of the assistant sintering agent added is dependent upon the kind of ceramics. Although the assistant sintering agent has the function of promoting the densification of ceramics, it is apt to remain at the grain boundary and the like and has a bad influence upon the characteristics of the sintered ceramic body sintering. For example, referring now to the sintering of $Si_3N_4$, MgO and $Al_2O_3$, added as the assistant sintering agent, remian at the grain boundary of $Si_3N_4$ in the form of a glassy phase also after sintering, so that there is a disadvantage in that the glassy phase on the grain boundary is softened thereby reducing the strength at high temperature exceeding 1,000° C.

Furthermore, since the ceramic powders and particles can not be plastically deformed differently from metallic powders, the pressed body is densified to an extent of at most 70% of the theoretical density thereof even when pressed under high pressures. For example, when SiC powders and iron powders are pressed under a pressure of 5 ton/cm$^2$ by a cold hydrostatic forming, step the pressed body of iron powders can be densified to 95% of the theoretical density thereof while the pressed body of SiC powders can be densified only to 65% of the theoretical density thereof. As described above, the pressed body of ceramic powders has a lower density prior to the sintering, so that densification by sintering leads to a great difference in size between the ceramic body before and after the sintering, thereby making it difficult to accurately control the dimensional accuracy of the sintered body. When the above described SiC having a density of the pressed body of 65% is sintered under normal pressure to densify to the almost theoretical density thereof, the contraction percentage amounts to 13.3% calculated for one side. For this reason, at present, the improvement of the sintered body in dimensional accuracy relies upon the working after the sintering.

In addition, referring to the working of ceramics, the sintered ceramic body of ceramics is very hard in general in comparison with metals, so that it must be worked by grinding by means of a diamond grindstone at present, therefore it is remarkably difficult to work the sintered ceramic into a complicated shape. For this reason, in order to obtain cerammic articles having a complicated shape, it is necessary to impart the desired shape to the caramic articles before they are sintered. Even in this case, a large number of problems occur in that it is difficult to work the pressed body of ceramic powders because the useful lifetime of tools used for adjusting the shape of the pressed body being remarkably short due to the high hardness of ceramic powders, and the like.

As described above, according to the conventional method of producing ceramic articles, a remarkably large number of processes including a process for synthesizing ceramic powders, a sintering process and a working process are required, which requires much time, and result in increased energy loss. Further the assistant sintering agent added for promoting the sintering of ceramic powders is apt to diminish the desired characteristics of the ceramics. Since it is impossible to sufficiently increase the density of the pressed body of ceramic powders, the contraction percentage of the pressed body of ceramic powders in the sintering process is large, thereby making it difficult to accurately control the dimensional accuracy of the sintered body made from the ceramic powders. That is to say, a large number of problems have occured in that it is difficult to work not only the pressed body of ceramic powders but also the sintered body thereof and the like.

In addition, the strength and toughness are the most important problems in the use of ceramics. The strength and thoughness are related the reliability of materials.

Almost of ceramics have covalent bonds thereby having an elastic modulus several times that of metals and leads to not only an elastic deformation, but also plastic deformation.

For this reason, the sintered bodies of ceramic powders are remarkably sensitive to the internal defects thereof, so that when once the cracks start to grow, it is almost impossible to stop the growth of the cracks which causes breakage at one stroke. The ceramics are greatly different from metals in this respect. Accordingly, various kinds of attempts have been made in order to overcome the brittleness of ceramics.

One such attempt to stop the growth of cracks is by giving the pointed end of the cracks a compression stress using the volume expansion accompanied by the phase transformation of the ceramics dispersed phase. This is represented by partially stabilized $ZrO_2$. However, according to this method, the phase transformation is brought on with the elevation of temperature before the stress is given, thereby the mechanism of reinforcement disappears.

Another such is the reinforcement of the ceramics by bonding ceramic particles with a metallic boundary phase, as in cermets. According to this method, although the damping effect against impact is superior due to the existance of a highly tough metallic phase among ceramic particles, the boundary phase is softened at high temperatures thereby reducing the strength of the cermets.

Also another attempt to reinforce the ceramics is reinforcement utilizing the mechanism of fiber-reinforcement, in which the breaking energy is increased by dispersing ceramic fibers of a kind different from that of the ceramics of the matrix in the to prevent the growth of cracks. However, a procedure for uniformly dispersing ceramic fibers in the matrix of ceramics is difficult to achieve. In addition, also the intimacy of the ceramic fibers with the ceramics of the matrix has not been sufficiently made clear, so that this method has not reached a practically usable stage.

As described above, although various kinds of means have been taken in order to improve ceramics in toughness, they are insufficient or sacrifice characteristics other than toughness.

Considering the conventional methods of producing ceramics in order to obtain ceramics according to the present invention wherein spherical metallic particles are dispersed in the matrix of ceramics, a mixture comprising ceramic powders and metallic powders must be sintered under high pressures. However, the sintering temperature of ceramics is apt to be higher than the melting points the metals and in such cases, the metals are molten during the sintering process to form such structure that the mentals are buried among ceramic particles thereby the structure according to the present invention, in which spherical metallic particles are dispersed in the matrix of ceramics, can not be obtained. Even in such cases that the melting points, of metals are higher than the sintering temperatures of ceramics to the contrary, if the intimacy of ceramic particles with metallic particles is poor, the densification of the ceramics is hindered thereby producing a large number of voids within the sintered body. In addition, there is a great possibility that the unification of metallic particles may progress with an increase of the volume ratio of the metals, thereby the a structure, in which metals are minutely and uniformly distributed, rather a structure in which the larger metallic particles are unevenly distributed is obtained.

As described above, according to the conventional sintering methods, it has been difficult to obtain highly tough ceramics of the structure according to the present invention in which spherical metallic particles are minutely and uniformly dispersed therein.

The composite materials comprising metals and ceramics such as nitrides, carbides, borides and silicides in combination have a high utility value in that the materials having excellent workability and high toughness, incidental to metals, together with high heat resistance, corrosion resistance and abrasion resistance, incidental to ceramics. In addition, in the production of parts, which are complicated in shape and difficultly produced from ceramics alone, the production cost may be reduced by making only parts made of ceramics for parts requiring the functions of ceramics.

To such objects, the conventional methods of producing composite materials comprising metals and ceramics have included a "ceramics-coating" method and a "melting-spray" method. However, these methods have defects in that it is difficult to form a thick layer and it is expensive.

Also a method of producing composite materials by bonding metals to the preliminarily produced sintered body of ceramics can be considered. However, it is difficult to bond metals to ceramics, so that such method has not practically used yet.

In respect to the various kinds of problems, described above the present inventions have achieved the present invention as the result of the investigation and development of a method fo sintering highly tough ceramics reinforced with metallic particles dispersed therein and in obtaining compact ceramic articles without damaging the characteristics incidental to ceramics. Also, the present method makes it possible to obtain ceramics having a uniform structure and, the present invention also relates to a method of producing composite materials comprising metals and ceramics inexpensively without any substantial limiting of the shape thereof.

The present invention will be in detail described below. Prior to the detailed description of the present invention, the drawings will be roughly described. FIG. 1 is a process diagram showing a method (I) according to the present invention and a conventional method (II).

Figure 4:
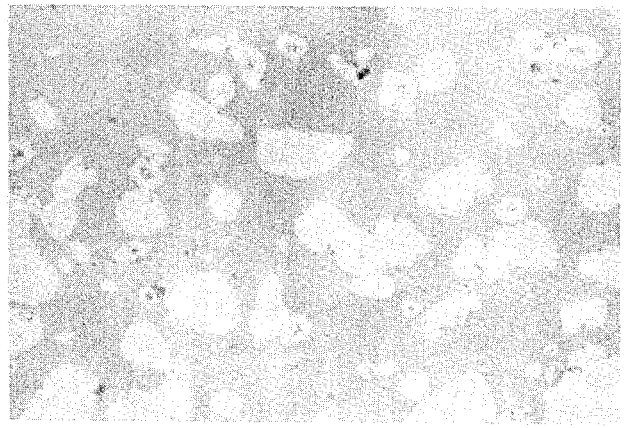

FIG. 4 is an enlarged microscopic photograph (at the magnification of 1,000) showing the dispersion of reinforced TiB$_2$-Ti ceramics produced in an example of the present invention. The present invention is greatly different from conventional sintering methods in that the synthesis of ceramics and the production of a compact sintered body are simultaneously possible by utilizing the reaction heat generated when ceramics are synthesized from metallic elements and nonmetallic elements without adding any external heat or only heating up to temperatures remarkably lower than the usual singering temperature.

For example, in the reaction wherein is synthesized from Ti and C, a reaction heat of 55.3 Kcal/mol is generated with the formation of TiC, as shown in the following equation (1):

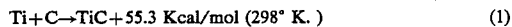

$$Ti + C \rightarrow TiC + 55.3 \text{ Kcal/mol } (298° \text{ K.}) \tag{1}$$

Accordingly, if a part of a compactly pressed body of a powdery mixture comprising Ti and C is ignited by heating to compulsorily start the reaction of the equation (1), the parts adjacent to the ignited part start the reaction in turn by the reaction heat and the chain reaction progresses all over the pressed body of powder whereby the synthesis and sintering of the ceramic body is simultaneously completed.

Figure 1A:
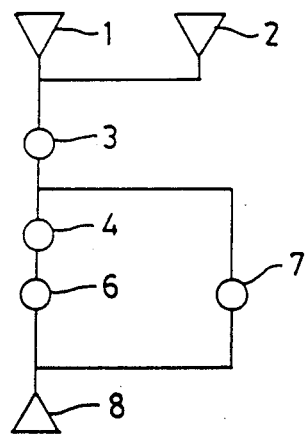
Figure 1B:
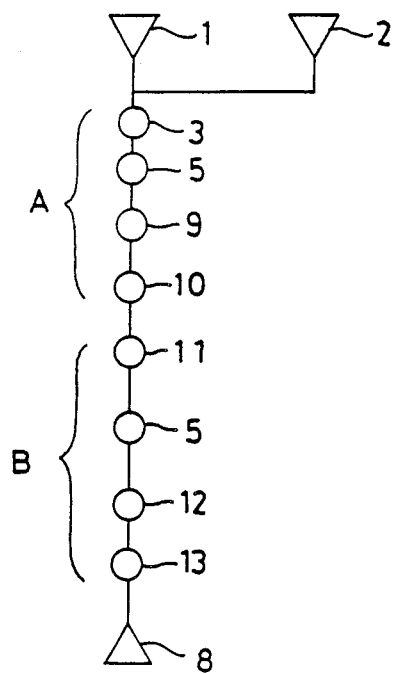

Accordingly, the compact sintered body of ceramics can be obtained according to the present invention very simply in comparison with a conventional method in which the synthesis and sintering of ceramic powders are carried out in the separate processes. FIG. 1 shows the simultaneous synthesis and sintering of SiC in comparison with conventional processes.

Referring to FIG. 1, the reference numeral 1 represents Si powders, 2 represents C powders, 3 represents a mixing process, 4 represents a high-pressur pressing process, 5 represents a pressing process, 6 represents a simultaneous synthesizing and sintering process, 7 represents a simultaneous high-pressure synthesizing and sintering process, 8 represents a SiC compact sintered body, 9 represents a heating process, 10 represents a smashing process, 11 represents a process for adding and mixing an assistant sintering agent, 12 represents a sintering process, 13 represents a working process, A represents a process for synthesizing powders, and B represents a sintering process.

In addition, although a special electric furnace capable of producing high temperature of about 1,500° to 2,000° C. with controlling an atmosphere is required in the conventional method in order to sinter ceramics, almost all of the energy required for sintering is supplied by the reaction heat generated when the ceramics are synthesized, so that only a vessel for controlling the atmosphere and an ignition apparatus for starting the synthetic reaction are required. Since a heating mechanism is not required, the apparatus is remarkably simplified in the simultaneous synthesizing and sintering method according to the present inventin. In addition, when the amount of the reaction heat generated in the synthesis is small such as to require preliminary heating of the pressed body. Even in such cases, however, the temperatures required for heating are remarkably lower in comparison with the sintering temperatures conventionally. Accordingly, the simultaneous synthesizing and sintering method according to the present invention is considered to be epoch-making also in respect to saving energy saving. The simultaneous method of synthesizing and sintering for producing a compact sintered body according to the present invention are classified into two methods. One of a method is where the ignition is carried out under high pressures in a high-pressure generating apparatus and the synthesis and sintering are simultaneously carried out with the assistance of high pressures. Any of a uniaxial pressing and isotropic hydrostatic pressing procedure may be used for a method of pressing. Another one of them is a method in which high pressures are given prior to the sintering process by the uniaxial pressing method or the isotropic hydrostatic pressing method and then the ignition is carried out to simultaneously synthesize and sinter ceramics. When the mixture comprising methallic elements and nonmetallic elements is pressed under high pressures, the powders themselves are plastically deformed, so that they may be preliminary densified to 90% or more of the theoretical density thereof. Accordingly, the dimensional change in the simultaneous synthesizing and sintering process is small, and therefore it is easy to accurately control the dimensional accuracy of the sintered body.

On the contrary, in a case where ceramic powders are sintered, the density of the pressed body of powders can be increased only to 70% or less of the theoretical density thereof, so that the contraction percentage is large thereby it is difficult to accurately control the dimensional accuracy of the sintered body.

Furthermore, even in the case where the pressed body of powders is worked into the desired shape prior to the sintering process in order to obtain ceramic articles which are complicated in shape, the pressed body of the mixture comprising metallic elements and nonmetallic elements is compact and soft which is different from ceramic powders per se, so that the articles, which are complicated in shape, can be worked to high accuracy. Also the tools used for adjusting the shape can be used in the same manner as for the working of usual metals.

As described above, the present invention is greatly improved in the working of the pressed body of powders prior to the sintering process.

In addition, according to the present invention, metallic elements are combined with nonmetallic elements to simultaneously synthesize and directly obtain the sintered body, so that an assistant sintering agent for substantially densifiying is not required. Accordingly, a compact sintered body made of ceramics of high purity can be obtained without damaging the characteristics incidental thereto. Furthermore, the sintering method according to the present invention is most suitable for ceramics used in cases wherein the existence of impurities must be avoided.

The shape of crystalline particles of the sintered body can be controlled by changing the position to be ignited and the ignition area when the mixture comprising metallic elements and nonmetallic elements is pressed and then the resulting pressed body is compulsorily ignited at a part thereof so as to start the synthetic reaction. For example, in the case of a one-point ignition, as shown in FIG. 2 (I), the simultaneous synthesis and sintering progresses only in one direction, so that the crystalline particles of the sintered body have an orientation effect while in the case of the multipoint ignition, as shown in FIG. 2 (II), the crystalline particles in the central portion of the sintered body are isotropic and uniform.

Figure 2A:
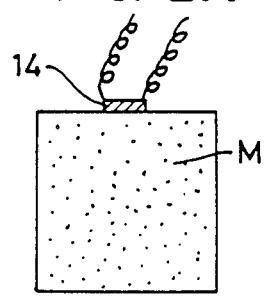
FIG. 2 is a diagram showing an ignition method for starting the reaction of the present invention, with (I) designating the one-point ignition method, and (II) designating the multi-point ignition method.
Figure 2B:
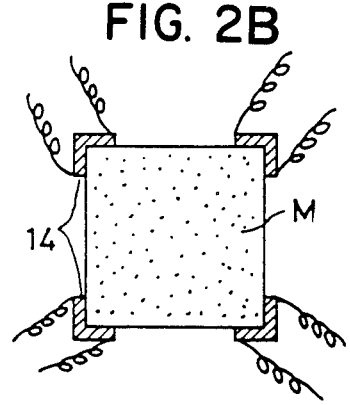

In addition, referring to FIG. 2, 14 designates a carbon heater and M designates a pressed body of the mixture.

Figure 3:
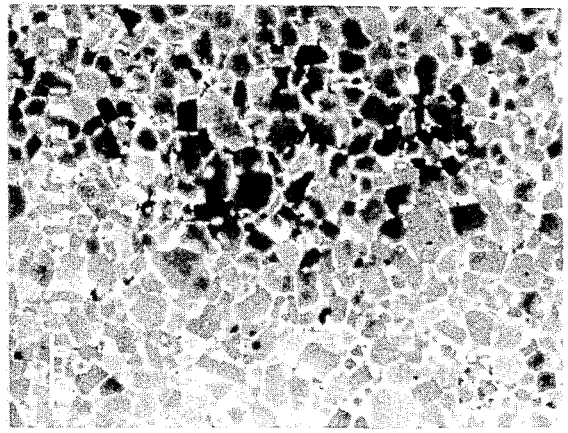
FIG. 3 is a fracture microscopic photograph (at the magnification of 1,200) showing the central portion of a TiB$_2$ sintered body produced by a method according to the present invention.

The fracture structure of the central portion in the sintered body of $TiB_2$ produced by the multipoint ignition is shown in FIG. 3. It can be seen from the photograph that the crystalline particles are isotropic and uniformly and minutely distributed.

If the carbon heater is used for the ignition, the ignition area and ignition shape can be optionally changed, so that the use of the carbon heater is remarkably advantageous for uniformly sintering the articles which are complicated in shape. A high-frequency induction heating, an electron-beam heating, a laser heating, and heating using an assistant combustion agent and the like may be used for the ignition in addition to the above described heating by a carbon heater.

Furthermore, the diameter of the crystalline particles of the sintered body can be controlled by changing the ignition area and the pressure in the sintering process. The growth of the crystalline particles is increasingly suppressed with an increase in the pressure given in the siumutaneous sythesizing and sintering process, thereby making it possible to obtain a compact sintered body composed of uniform and minute crystalline particles.

If the reaction heat generated when metallic elements are combined with nonmetallic elements to synthesize ceramics is too large, the sintering temperature can not be controlled, so that the reaction explosively progresses reaching susperhigh temperatures of about 4,000° C. according to the circumstances. The decomposition and vaporization of ceramics and the abnormal growth of the crystalline particles therefore will take place in such sintered body and produce a large number of defects therewithin. Accordingly, in case where the reaction heat generated is large when the ceramics are formed, a compact sintered body composed of uniform and minute crstalline particles can be obtained by adding powders of ceramics of the same kind as the ceramics to be synthesized or powders of ceramics different from the ceramics to be synthesized. This dilutes the synthetic reaction and controls the amount of the reaction heat in the sintering process.

In addition, the composite materials of the present invention is greatly different from the conventional composite ceramic materials in that the composite materials are not obtained by sintering the mixture comprising ceramic powders and the dispersoids such as metals. Rather, according to the present invention the ceramics are synthesized from metallic powders and nonmetallic elements and the ceramics are simultaneously sintered, and the mixture contains metals in a ratio larger than the stoichiometric ratio; further the metallic particles which remain unreacted after the sintering process are uniformly dispersed in the matrix of the ceramics.

As described in the prior arts, in the case where a mixture comprising ceramic powders and metallic powders is used as the starting material, a large number of problems arise, such as the metals melting at higher sintering temperatures and the difficult of and the sintering temperature, the problem of the producing an intimate mixture of ceramic particles and metallic particles, and the occurence of larger particles due to the aggregation of metallic particles. On the contrary, in the present invention, these problems can be solved simultaneously carrying out the synthesis and sintering of ceramics.

In respect to problems involving the melting of the metals and the difficulties in controlling the sintering temperatures, even in a case where the temperature for simultaneously synthesizing and sintering ceramics is higher than the melting point of metal, the metallic particles adjacent to the nonmetallic elements enter into the ceramics from the surface thereof to the inside thereof in the synthetic process, so that, even though the temperatures exceeding the melting point of metal are reached temporarily, the metal is molten within the shell of ceramics and does not flow out of the shell. Accordingly, after cooling; a structure containing spherical metallic particles dispersed in the matrix of ceramics therein can be obtained.

For example, in a case where a composite material containing spherical metallic Ti particles dispersed in the matrix of $TiB_2$ is produced, a reaction heat of 70.0 Kcal/mol is generated when $TiB_2$ is formed, as shown in the following equation (2):

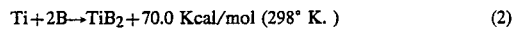

$$Ti + 2B \rightarrow TiB_2 + 70.0 \text{ Kcal/mol (298° K.)} \qquad (2)$$

Accordingly, if a part of the powdery mixture comprising Ti powders and B powders so as to contain the former at a ratio larger than the stoichiometric ratio is ignited by heating to start the reaction of the equation (2) while pressing the powdery mixture under pressure, the parts adjacent to the ignited part start the reaction in turn by the reaction heat and the chain reaction progresses all over the pressed ceramic body to simultaneously the synthesize and sinter the ceramics. It appears that temperatures exceeding 2,000° C. are reached temporarily when $TiB_2$ is formed. Accordingly, although there is the possibility that the non-reacted Ti will be temporarily molten, the outer shell of metallic Ti is turned into $TiB_2$ to prevent the molten Ti from flowing out between the ceramic particles, so that, after cooling, a structure containing spherical particles of metallic Ti dispersed in a gray matric of ceramics is obtained, as shown in FIG. 4. FIG. 4 shows the state of the particles of metallic Ti dispersed in a matrix of $TiB_2$.

As to the intimacy of the ceramics with the metallic particles dispersed in the matrix, since the metallic particles are turned the ceramics from the surface thereof toward the inside thereof and the ceramics in the outer shell are sintered to form the matrix, the intimacy of the matrix with the dispersed particles is remarkably superior in that the dispersed particles are chemically and strongly bonded to the matrix.

As shown also in FIG. 4, the dispersed metallic Ti particles are strongly bonded to the $TiB_2$ matrix without forming any gaps therebetween.

Furthermore, according to the method of simultaneously synthesizing and sintering the ceramics of the present invention, since the excess non-reacted portion of Ti is isolated by the outer shell of $TiB_2$ during the sintering process, there is a small possibility that the excess non-reacted Ti may be brought into direct contact with each other; thus, there is an advantage in that large size metallic particles are unlikely to be produced. As shown also in FIG. 4, dispersed metallic Ti particles almost exist independently.

Metal dispersed reinforced ceramics produced in the above described manner contain ceramics as the matrix, so that they not only have a remarkably high hardness and thus are superior in abrasion resistance, but also they are remarkably improved in impact resistance since the dispersed metallic particles play act as cushion for impact. In addition, there is a good possibility that the sliding characteristics can be improved by dispersing the metallic particles of a lower hardness in the ceramic matrix of a higher hardness. In fact, as to the friction factor, the metal dispersed reinforced ceramics have a friction factor less than that of the ceramics without the dispersed metallic particles therein.

Also as to the high-temperature strength, although the cermets have a disadvantage in that the strength is suddenly lowered due to the softening of the metallic grain boundary phase existing among the ceramic particles, the metal dispersed reinforced ceramics according to the present invention contain ceramics as akeletons existing among the particles, so that the rate of the reduction in strength and hardness at high temperatures is remarkably small in comparison with that of the cermets.

Also as to the corrosion resistance, although cermets containing metals in the continuous grain boundary have a disadvantage in that the metallic grain boundary phase is preferentially corroded with acids and alkalies, so that the bond among the ceramic powders is broken so as to make it incapable of use, the metal dispersed reinforced ceramics according to the present invention are remarkably improved in corrosion resistance, since the ceramic matrix is corrosion resistant and the circumference of metallic particles, which have little resistance against corrosion, is protected with by the ceramic matric and thus do not contact with a corrosive atmosphere.

As described above, the metal dispersed reinforced ceramic according to the present invention have high hardness, superior abrasion resistance, superior high-temperature characteristics and superior corrosion resistance, incidental to ceramics, together with the advantages incidental to metals, such as high toughness and superior impact resistance.

In addition, the present invention has been achieved as a result of investigating various means for obtaining ceramics having a uniform composition and structure and discovered that the disadvantages of the sintered body produced according to the prior art can be eliminated by making the sintering progress from the inside of the pressed body. That is to say, it has been found from the experiments carried out in ceramics formed in an exothermic reaction, that if the reaction is started within the pressed body, the reaction continuously progresses until the surface of the pressed body is sintered without adding external heat or by adding a slight amount of heat to obtain the sintered body.

The sintered body obtained according to the present invention includes carbides such as TiC, ZrC, HfC, VC, NbC, Ta$_2$C and TaC; nitrides such as Mg$_3$N$_2$, BN, AlN, Si$_3$N$_4$, TiN, ZrN, HfN, VN, NbN and TaN; borides such as TiB$_2$ and TaB$_2$; silicides such as TiSi$_3$, ZrSi, ZrSi$_2$ and MoSi$_2$; the mixtures comprising at least two compounds and the compounds having indefinite ratios obtained from the above described compounds.

As to the composition of the pressed body, for example, for carbides composed of a mixture of metallic elements and carbon, a mixture of metal oxides and carbon and the like can be used. For nitrides, it is necessary only to carry out the reaction in an atmosphere of nitrogen gas.

It goes without saying that metal carbonitrides can be obtained by the reaction of metallic elements with carbon in an atmosphere of nitrogen gas or ammonia gas.

The composite for the pressed body is obtained by forming the powdery mixture in the usual manner but it is desirable to control the density of the pressed body in respect to the reactivity. That is to say, in the case where the reaction with an atmosphere is not required, a high-pressure pressing is adopted while in a case where a reaction with an atmosphere is required, a pressed body of low density is prepared.

The sintering of the pressed body is made to progress from within by heating a heater buried in the portion, from which the sintering is started, to start the reaction and the like. In addition, a method, in which the external heat is added to make the sintering progress also from the outer portion, and the method, in which external heat is added in addition to the reaction heat to continue the reaction, are also effective.

Also a method, in which the obtained sintered body is reheated to further make the sintering progress, and a method, in which HIP is carried out, are also effective.

In addition, the present invention provides a method of producing a composite comprising metals and ceramics wherein the pressed body layer comprising a powdery mixture, from which ceramics can be formed, is formed by an exothermic reaction of the powdery mixture, which can form ceramics by the exothermic reaction, or by an exothermic reaction of the powdery mixture with an atmosphere. Part of the resulting pressed body layer comprising the powdery mixture is heated under pressure according to the present invention to start the reaction, and a chain reaction is induced within the pressed body by the reaction heat to form a ceramic layer and the resulting ceramic layer simultaneously adhered to the surface of the metallic particles, thereby obtaining the composite body comprising metals and ceramics.

In general, a conventional ceramic body is sintered or reactively sintered by adding a large amount of heat energy to the pressed body of the ceramic powders or the pressed body of the powdery mixture capable of forming ceramics by a reaction among the ingredients themselves.

However, in many cases, ceramics are formed by exothermic reactions. The present invention was achieved as a method of producing a composite comprising metals and ceramics from various kinds of investigations carried out, taking the above described points into consideration.

As indicated above, the ceramics, to which the present invention can be applied, include the following compounds:

(a) Carbides: TiC, ZrC, HfC, VC, NbC, Ta$_2$C, TaC, SiC (b) Nitrides: BN, AlN, Si$_3$N$_4$, TiN, ZrN, HfN, VN, NbN, TaN (c) Borides: TiB$_2$, TaB$_2$, ZrB$_2$, HfB$_2$ (d) Silicides: TiSi$_3$, ZrSi, MoSi$_2$ Also mixed ceramics comprising at least two kinds of compounds selected from the above described compounds may be produced according to the present invention.

The powdery mixture for forming the pressed body layer includes a mixture of metallic elements and carbon or a mixture of metal oxides and carbon in the case where the ceramics to be formed are carbides; a combination of metallic elements or metal oxides and silicon or $SiO_2$ in the case where the ceramics to be formed are silicides; and a combination of metallic elements or metal oxides and boron in the case where the ceramics to be formed are borides. On the other hand, in the case where the ceramics to be formed are nitrides, the pressed body of metallic elements or metal oxides are reacted with nitrogen gas or ammonia gas.

It is necessary only to heat a part of the pressed body to temperatures sufficient for starting the reaction in order to make the reaction of the above described pressed body of the powdery mixture progress to form the desired ceramics. A heating method by a heater and the like are used as a heating method. Also it is effective to add external heat if necessary in order to make the chain reaction progress all over the pressed body layer of the powdery mixture to convert it into a complete ceramic layer. Also in this case, the chain reaction can be brought on at a heating energies smaller than that of a conventional sintering process.

On the other hand, it is important, as seen from the objects of the present invention, to strongly adhere the ceramics formed by the reaction to the metallic layer.

The present inventors have found that the composite, in which the ceramic layer is adhered to the surface of metals, can be formed by holding the pressed body layer of the powdery mixture for forming the ceramics and metals under pressure to start the reaction in the pressed body layer of the powdery mixture. The mechanism for adhering the ceramic layer to the metallic surface includes the following two mechanisms: One of them is a mechanism in which a part of the metallic surface adjacent to the powdery mixture layer for forming ceramics is molten by the reaction heat generated during the formation of ceramics and enters the holes in the pressed body of the powdery mixture under the capillary force. According to this procedure pressure is imparted to the spaces among the pressed body of the powdery mixture and metals and simultaneously the reaction of the pressed body of the powdery mixture occurs on to form ceramics in which the ceramic layer is adhered to the metallic surface.

This mechanism is progresses when the metals are hardly reacted in the ceramic mixture and the melting points of the metals are comparatively low.

Another mechanism is one in which a supplementary ceramic layer is formed on the interface between the metals and the formed ceramics, brought on when the chemical reaction of the metals with the mixture for forming ceramics is violent.

The present invention will be below described in detail with reference to the examples.

EXAMPLE 1

Metallic Ti powders of —325 mesh of 47.90 g (1 mol) are mixed with B powders having an average particle diameter of 1.0 μm of 21.62 g (2 mols) and then the resulting mixture is enclosed in a vacuum sealed up vessel made of Mo. This sealed up vessel is provided with a carbon heater as an ignition apparatus and a lead wire is taken out of the vessel. The sealed up vessel is placed in a high-pressure generating apparatus and then the carbon heater is electrified with giving pressure with Ar gas of 2,000 atm. to ignite. Upon the start of the reaction forming $TiB_2$, an electric current is switched off.

The sintered body of $TiB_2$ obtained in the above described manner has a density of 99.3% of the theoretical density. The conversion ratio to $TiB_2$ is 99% or more.

EXAMPLE 2

Metallic Zr powders of —325 mesh of 91.22 g (1 mol) are mixed with B powders having an average particle diameter of 1.0 μm of 21.62 g (2 mols) and then the resulting mixture is pressed in a metal mold having a diameter of 40 mm at a pressure of 5 ton/cm². A part of the resulting columnar pressed body is cut off and tested in respect to the porosity by the mercury-injection method to obtain a porosity of 9.3%. The remaining columnar pressed body is placed in the reaction vessel and a carbon heater is brought into contact with the upper and lower sides of the column. The inside of the reaction vessel is filled with Ar gas and then the carbon heater is electrified to ignite. Upon the start of the reaction forming $ZrB_2$, an electric current is switched off.

The sintered body of $ZrB_2$ obtained in the above described manner has a density of 90.5% of the theoretical density. The conversion ratio to $ZrB_2$ is 99% or more.

EXAMPLE 3

Metallic Ti powders of —325 mesh of 47.90 g (1 mol) are mixed with amorphous carbon having an average particle diameter of 100 Å of 12.01 g (1 mol) and then a part of the resulting powdery mixture is pressed in a metal mold having a diameter of 6 mm and a height of 6 mm at a pressure of 2 ton/cm² to form a columnar pressed body. The resulting columnar pressed body is housed in a vessel made of BN and the upper end surface of the pressed body is brought into contact with a carbon heater, then the vessel housing the columnar pressed body therein is placed in a superhigh pressure generating apparatus and the carbon heater is electrified with giving pressure of 30,000 kg/cm² to ignite. Upon the start of the reaction forming TiC, an electric current is switched off.

The sintered body of TiC obtained in the above described manner has the density of 99.7% of the theoretical density. The conversion ratio to TiC is 99% or more.

EXAMPLE 4

Metallic Si powders of —325 mesh of 28.09 g (1 mol) are mixed with amorphous carbon having an average particle diameter of 100 Å of 12.01 g (1 mol) and then the resulting powdery mixture is pressed in a CIP apparatus at a pressure of 6 ton/cm² to form a columnar pressed body having a diameter of 15 mm. A part of the resulting columnar pressed body is cut off and tested on the porosity by the mercury-injection method to obtain the result that no penetration of mercury is observed. It is thought from this fact that the porosity of this columnar pressed body is 5% or less. The remaining columnar pressed body is placed in a reaction vessel. After the inside of the reaction vessel was evacuated until about $1 \times 10^{-5}$ torr, the inside of the reaction vessel is preliminarily heated to 800° C. and then the upper end surface of the column is heated by laser beams to ignite it. Upon the start of the reaction forming SiC, the radiation of laser beams is stopped.

The sintered body of SiC obtained in the above described manner has the density of 95.6% of the theoretical density. The conversion ratio to SiC is 97%.

EXAMPLE 5

Metallic W powders of —325 mesh of 183.85 g (1 mol) are mixed with amorphous carbon having an average particle diameter of 100 Å of 12.01 g (1 mol) and then the resulting powdery mixture is enveloped in a vessel made of W and the vessel is evacuated and sealed up. This vessel is provided with a carbon heater as an ignition apparatus and a lead wire is taken out of the vessel. The sealed up vessel is placed in a high-pressure generating apparatus and preliminarily heated to 800° C. and then the carbon heater is electrified giving pressure with Ar gas of 2,000 atm. to ignite the system. Upon the start of the reaction forming WC, an electric current is switched off.

The sintered body of WC obtained in the above described manner has the density of 98.6% of the theoretical density. The conversion ratio to WC is 97%.

EXAMPLE 6

Metallic Al powders of —325 mesh of 26.98 g (1 mol) is pressed in a metal mold having a diameter of 60 mm at a pressure of 2 ton/cm$^2$ to form a disc-like pressed body. The resulting disc-like pressed body has a density of 91.2% of the theoretical density. The disc-like pressed body is placed in a high-pressure generating apparatus and the upper surface is brought into contact with a carbon heater at one end thereof. After the inside of the high-pressure generating apparatus is filled with $N_2$ gas of 1,500 atm, the heater is electricfied to ignite the system. Upon the start of the reaction forming AlN, the electric current is switched off.

The sintered body of AlN obtained in the above described manner has a density of 92.3% of the theoretical density. The conversion ratio to AlN is 93%.

EXAMPLE 7

Metallic Si powders of —325 mesh of 28.09 g (1 mol) are mixed with $Si_3N_4$ powders having an average particle diameter of 1 μm of 14.03 g (0.1 mol) added for diluting the synthetic reaction of $Si_3N_4$ to control the amount of heat in the sintering process. The resulting powdery mixture is pressed in a metal mold having a diameter of 60 mm at a pressure of 2 ton/cm$^2$ to form a disc-like pressed body, which has a theoretical density of 90.3%. The resulting disc-like pressed body is placed in a high-pressure generating apparatus and the upper surface of the disc-like pressed body is brought into contact with a carbon heater at one end thereof. After the inside of the high-pressure generating apparatus is filled with $N_2$ gas of 1,500 atm. the heater is electrified to ignite the system. Upon the start of the reaction forming $Si_3N_4$, the electric currect is switched off.

The sintered body of $Si_3N_4$ obtained in the above described manner has the density of 93.1% of the theoretical density. The conversion ratio to $Si_3N_4$ is 95%.

EXAMPLE 8

Metallic Ta powders of —325 mesh of 180.95 g (1 mol) are mixed with metallic Si powders of —325 mesh of 56.17 g (2 mols) and then the resulting powdery mixture is enveloped in a vessel made of Ta. The vessel is evacuated and sealed up. This vessel is provided with a carbon heater as an ignition apparatus and a lead wire is taken out of the vessel. The vessel is placed in a high-pressure generating apparatus and preliminarily heated to 600° C. and then the carbon heater is electrified with giving pressure with Ar gas of 2,000 atm. to ignite the system. Upon the start of the reaction forming WC, an electric current is switched off.

The sintered body of $TaSi_2$ obtained in the above described manner has a density of 97.2% of the theoretical density. The conversion ratio to $TaSi_2$ is 96%.

EXAMPLE 9

Metallic Ti powders of —325 mesh of 71.85 g (1.5 mols) are mixed with B powders having an average particle diameter of 1.0 μm of 21.62 g (2 mols) and then a part of the resulting powdery mixture is pressed in a metal mold at a pressure of 2 ton/cm$^2$ to form a columnar pressed body having a diameter of 5 mm and a height of 5 mm. After the pressed body is housed in a vessel made of BN, the vessel is placed in a superhigh-pressure generating apparatus and a carbon heater is electrified by bringing the upper end surface of the pressed body into contact therewith and to give a pressure of 30,000 atm. to ignite the system. Upon the start of the reaction forming $TiB_2$, an electric current is switched off.

The metal Ti dispersed reinforced $TiB_2$ sintered body has a density of 99.4% of the theoretical density. The structure of the inside of the sintered body obtained in the above described manner is shown in FIG. 4. It was found from the EPMA that the particles dispersed are metallic Ti and the matrix is $TiB_2$.

EXAMPLE 10

Metallic Mo powders of —325 mesh of 239.85 g (2.5 mols) are mixed with C powders having an average particle diameter of 1.0 μm of 12.01 g (1 mol) and then the resulting powdery mixture is enveloped in a vessel made of Mo. The vessel is evacuated and sealed up. This vessel is provided with a carbon heater as an ignition apparatus and a lead wire is taken out of the vessel. This vessel is placed in a high-pressure generating apparatus and preliminarily heated to 800° C. and then the carbon heater is electrified with giving pressure with Ar gas of 2,000 atm. to ignite the system. Upon the start of the reaction forming $Mo_2C$, the electric current is switched off.

The metallic Mo dispersed reinforced $Mo_2C$ sintered body obtained in the above described manner has a density of 99.1% of the theoretical density. The X-ray diffraction of this sintered body showed the peaks of $Mo_2C$ and Mo nearly corresponding to their molar ratio.

EXAMPLE 11

Ti powders are mixed with C powders (carbon powders) at a molar ratio of 1:1 and then the resulting powdery mixture is pressed by a CIP method at a pressure of 5 t/cm$^2$ to form a pressed body having a size of 30φ×30 H mm. The pressed body provided with a carbon heater buried in a hole formed therein is placed in a vacuum tank. If once the heater is electrified from outside to induce the reaction of Ti with C, the reaction of Ti with C is continuously made to progress by the reaction heat such that the sintering process progresses from the inside of the pressed body toward the surface thereof to form a sintered body having a size of nearly 25φ×25 Hmm.

Since it is difficult to obtain a compact sintered body by sintering a pressed body of TiC powders, the sintering according to the present invention is remarkably effective.

EXAMPLE 12

The sintering according to the present invention is applied to Zr+C, Ta+C, Ti+2B and Ti+Si under the same conditions as in Example 11. In every case, a compact sintered body can be obtained. In addition, a sintered body consisting of a solid solution $TiC_{0.7}N_{0.3}$ can be obtained by the reaction of Ti with C in an atmosphere of nitrogen gas.

EXAMPLE 13

Ti powders, Ta powders and C powders are mixed at a molar ratio of 1:1:2 and then the resulting powdery mixture is sintered under the same conditions as in Example 11. A sintered body consisting of a solid solution $Ti_{0.5}Ta_{0.5}C$ can be obtained.

EXAMPLE 14

Ti powders are mixed with C powders at a molar ratio of 1:1 and then Ni powders are added to the resulting powdery mixture at a ratio of 5% by weight. The finally obtained powdery mixture is pressed by a CIP method at a pressure of 5 t/cm$^2$ to form a sintered body having a size of 300φ×300 H. The resulting sintered body is heated by electrifying a carbon heater buried therein. The sintering process makes progress from the central portion of the pressed body and a sintered body containing a remarkably small number of pores therein can be obtained. On the other hand, a nonuniform sintered body containing porous portions therewithin is obtained by pressing the composition TiC—5% by weight Ni at a pressure of 5 t/cm$^2$ by a CIP method likewise and sintering the pressed body at 1,450° C.

EXAMPLE 15

A powdery mixture comprising silicon powders and carbon powders at a molar ratio of 1:1 is pressed at a pressure of 2,000 kg/cm$^2$ to form a pressed powdery body. The resulting pressed powdery body is placed in a hot press mold under the conditions that it is brought into contact with an iron block and an electric heater at the upper surface thereof. Then the electric heater mounted on the upper surface of the pressed powdery body is electrified under the conditions that the temperature reaches to 1,100° C. as a whole by heating the hot press mold from outside and a hot pressing force is held at 200 kg/cm$^2$ and in an atmosphere of Ar gas to heat the surface of the pressed powdery body thereby starting the reaction forming silicon carbide on the surface of the pressed powdery body. After the reaction is sufficiently started the electrification of the electric heater is stopped and then that hot pressing force and that temperature are maintained for 20 minutes. After the temperature and pressure were lowered the sample is taken out. The results of the X-ray diffraction shows that the pressed powdery body layer is almost completely turned into silicon carbide. In addition, it is found from the hardness ($H_v$) of the silicon carbide layer of 2,500 kg/mm$^2$ and the shear strength of the interface between the silicon carbide layer and metals of 30 kg/mm$^2$ that the composite body, in which iron is strongly adhered to silicon carbide, is formed.

EXAMPLE 16

A pressed powdery body of silicon powders is adhered to an iron block and the resulting assembly is treated in the similar manner as in Example 15 to obtain a composite body.

The pressure for pressing silicon powders is 1,000 kg/cm$^2$, the hot pressing temperature being 1,200° C., the hot pressing pressure being 200 kg/cm$^2$, the hot pressing atmosphere being nitrogen gas, and the reaction time being 20 minutes.

The pressed powdery body layer is formed of silicon nitride and has $H_v$ of 1,600 kg/mm$^2$ and shear strength of the interface between it and metals of 35 kg/mm$^2$.

What is claimed is:

1. A method of sintering ceramics comprising simultaneously synthesizing and sintering ceramics utilizing the reaction heat generated when at least one metal selected from the group consisting of metallic elements of Groups IIIb and IVb, except for Ti, Vb and VIb of the Periodic Table, is combined with at least one nonmetallic material made from elements selected from the group consisting of B, C and N, said reaction being carried out by pressing the mixture of metallic and non-metallic elements at high pressures sufficient to form a pressed body having a porosity of 30% or less and then heating a part of said pressed body at temperatures substantially lower than the temperature required to sinter the ceramics to start the synthetic reaction to produce the ceramics, whereby there is induced a synthetic reaction of the parts adjacent to the part heated as a result of the reaction heat generated by the synthetic reaction and wherein the entire pressed body is ultimately converted to a sintered ceramics, and controlling the speed of reaction by adding powders of the ceramics to be synthesized or powders of ceramics which are different from the ceramics to be synthesized as a diluent to control the temperature of reaction, such pressed body being preliminarily heated by means of an electron-beam heating, a high-frequency induction heating, a laser heating or by heating in which an assistant combustion agent is employed to initiate the reaction.

2. A method of sintering ceramics in which densification of the sintered body is promoted by carrying out the synthesis under high pressures in the sintering process using the reaction heat generated when the ceramics are synthesized from a mixture of at least one metal selected from the group consisting of metallic elements of Groups IIIb, IVb except for Ti, Vb and VIb of the Periodic Table and at least one metallic material made from non-metallic elements selected from the group consisting of B, C and N and wherein the mixture of said metallic elements and said non-metallic elements is pressed under high pressures until the porosity of the pressed body of 30% or less and wherein the sintering is then carried out by utilizing the reaction heat generated during the synthesis of the ceramics.

3. A method of sintering metal dispersed reinforced ceramics with particles of the same kind of metal as that employed in synthesizing the ceramics dispersed in the matrix of said ceramics, which comprises preparing a powdery mixture consisting essentially of at least one metallic material selected from the group consisting of metallic elements of Groups IIIb and IVb, except for Ti, Vb and VIb of the Periodic Table, and at least one non-metallic material selected made from non-metallic elements selected from the group consisting of B, C and N, such that the metallic powders are present in the mixture in amounts larger than the stoichiometric amount required to react with the non-metallic material and exothermically reacting the mixture under high pressures to synthesize the ceramics and wherein the matrix of said ceramics is simultaneously sintered with non-reacted metal dispersed therein.

4. A method of sintering metal dispersed reinforced ceramics with particles of the same kind of metal as that employed in synthesizing the ceramics dispersed in the matrix of said ceramics comprising pressing a powdery mixture of at least one metallic material selected from the group consisting of metallic elements of Groups IIIb, IVb except for Ti, Vb and VIb of the Periodic Table and at least one non-metallic material made from non-metallic elements selected from the group consisting of B, C and N, said metallic powders being present in amounts larger than that required to stoichiometrically react with the non-metallic powder and then heating a part of the pressed body to start the synthetic reaction and inducing the synthetic reaction of the parts adjacent to the heated part by utilizing the reaction heat generated during the reaction to progressively sinter the entire pressed body so as to chemically and strongly bond said metallic particles to said matrix.

5. A method of sintering metal dispersed reinforced ceramics, wherein particles of the same kind of metal as that used in preparing the ceramics are dispersed in the matrix of said ceramics, comprising preparing a powdery mixture consisting essentially of at least one metallic material selected from the group consisting of metallic elements of Groups IIIb, IVb except for Ti, Vb and VIb groups of the Periodic Table of at least one non-metallic material made from non-metallic elements selected from the group consisting of B, C and N so that the metallic powders are present in the mixture in amounts larger than that required to stoichiometrically react with the non-metallic material, synthesizing the ceramics by reacting the mixture, and sintering the mixture by the heat generated during the synthesis of the ceramics without adding external heat or by starting the reaction at temperatures substantially lower than the sintering temperature required to sinter the ceramic mixture so as to chemically and strongly bond said metallic particles to said matrix.

6. A method of sintering ceramics whereby a pressed body containing a powdery mixture comprising at least one metallic material selected from the group consisting of metallic elements of Groups IIIb, IVb except Ti, Vb and VIb groups of the Periodic Table is continuously reacted with at least one non-metallic material made from non-metallic elements selected from the group consisting of B, C and N, said reaction taking place as a result of the exothermic reaction of the powdered reactants or powders of said metallic elements with atmospheric gases, said pressed ceramic body being locally heated from within to start the reaction and wherein the reaction continuously progresses to the outer surface of the pressed body to produce a sintered body.

* * * * *